(12) United States Patent
Depauw

(10) Patent No.: US 8,607,901 B1
(45) Date of Patent: Dec. 17, 2013

(54) LAWNMOWER DRIVE SYSTEM

(76) Inventor: Arthur A. Depauw, Venice, FL (US)

(*) Notice: Subject to any disclaimer, the term of this patent is extended or adjusted under 35 U.S.C. 154(b) by 0 days.

(21) Appl. No.: 13/412,611

(22) Filed: Mar. 5, 2012

(51) Int. Cl.
*B62D 11/02* (2006.01)

(52) U.S. Cl.
USPC .......................................... 180/6.48; 180/6.5

(58) Field of Classification Search
USPC ................................................ 180/6.48, 6.5
See application file for complete search history.

(56) References Cited

U.S. PATENT DOCUMENTS

| | | | |
|---|---|---|---|
| 5,533,676 A | 7/1996 | Conley | |
| D409,208 S | 5/1999 | Eavenson et al. | |
| 6,056,074 A | 5/2000 | Heal et al. | |
| 6,434,917 B1 | 8/2002 | Bartel | |
| 6,578,656 B2 | 6/2003 | Samejima et al. | |
| 6,591,593 B1 | 7/2003 | Brandon et al. | |
| 6,808,032 B2 * | 10/2004 | Wuertz et al. | 180/6.48 |
| 7,172,041 B2 | 2/2007 | Wuertz et al. | |
| 7,918,305 B2 * | 4/2011 | Scherbring et al. | 180/408 |
| 8,132,984 B2 * | 3/2012 | Grahl | 404/112 |
| 2009/0236165 A1 * | 9/2009 | Kramer et al. | 180/200 |

* cited by examiner

*Primary Examiner* — Kevin Hurley
*Assistant Examiner* — Michael Stabley

(57) ABSTRACT

A lawnmower drive system for facilitating steering of a zero turn radius lawn mower and enhancing user comfort while mowing a lawn includes a lawnmower has a seat for supporting a person on the lawnmower. The lawnmower has a left drive wheel and a right drive wheel. A left armrest is coupled to the lawnmower. The left armrest is positioned proximate the seat. A right armrest is coupled to the lawnmower. The right armrest is positioned proximate the seat. A left joystick is coupled to the left armrest. The left joystick is operationally coupled to the left drive wheel. A right joystick coupled to the right armrest, the right joystick is operationally coupled to the right drive wheel.

13 Claims, 3 Drawing Sheets

LAWNMOWER DRIVE SYSTEM

BACKGROUND OF THE DISCLOSURE

Field of the Disclosure

The disclosure relates to lawn mowing devices and more particularly pertains to a new lawnmowing device for facilitating steering of a zero turn radius lawn mower and enhancing user comfort while mowing a lawn.

SUMMARY OF THE DISCLOSURE

An embodiment of the disclosure meets the needs presented above by generally comprising a lawnmower has a seat for supporting a person on the lawnmower. The lawnmower has a left drive wheel and a right drive wheel. A left armrest is coupled to the lawnmower. The left armrest is positioned proximate the seat. A right armrest is coupled to the lawnmower. The right armrest is positioned proximate the seat. A left joystick is coupled to the left armrest. The left joystick is operationally coupled to the left drive wheel. A right joystick coupled to the right armrest, the right joystick is operationally coupled to the right drive wheel.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
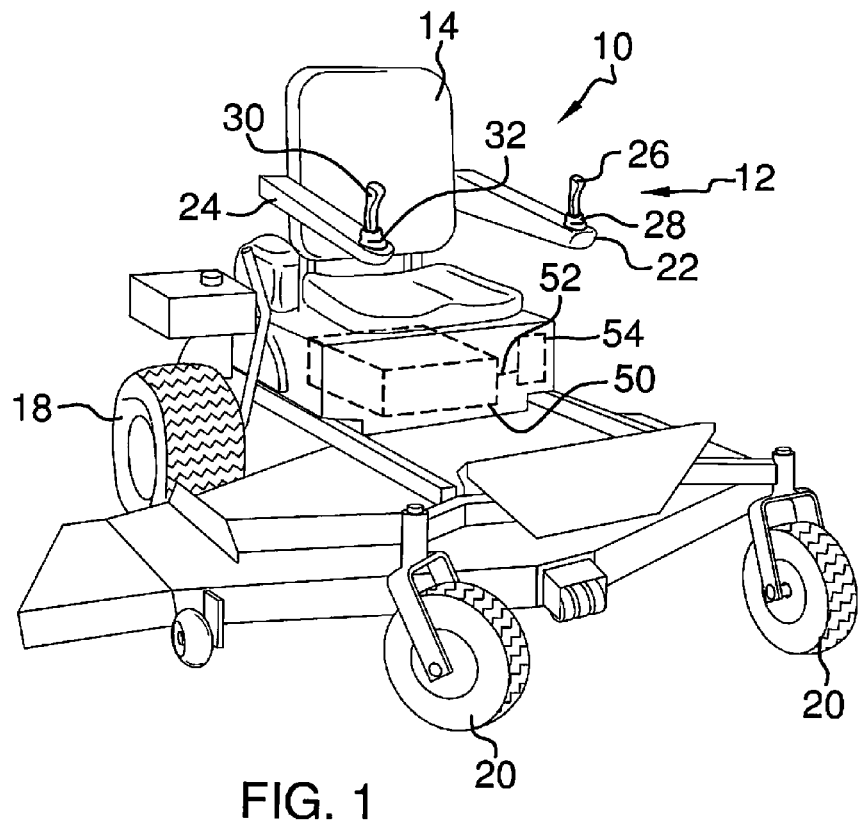
FIG. 1 is a top front side perspective view of a lawnmower drive system according to an embodiment of the disclosure.
Figure 2:
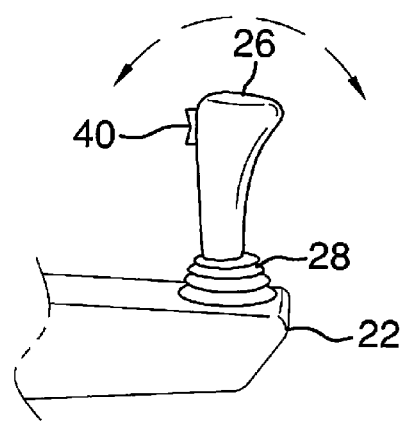
FIG. 2 is a side view of an embodiment of the disclosure.
Figure 4:
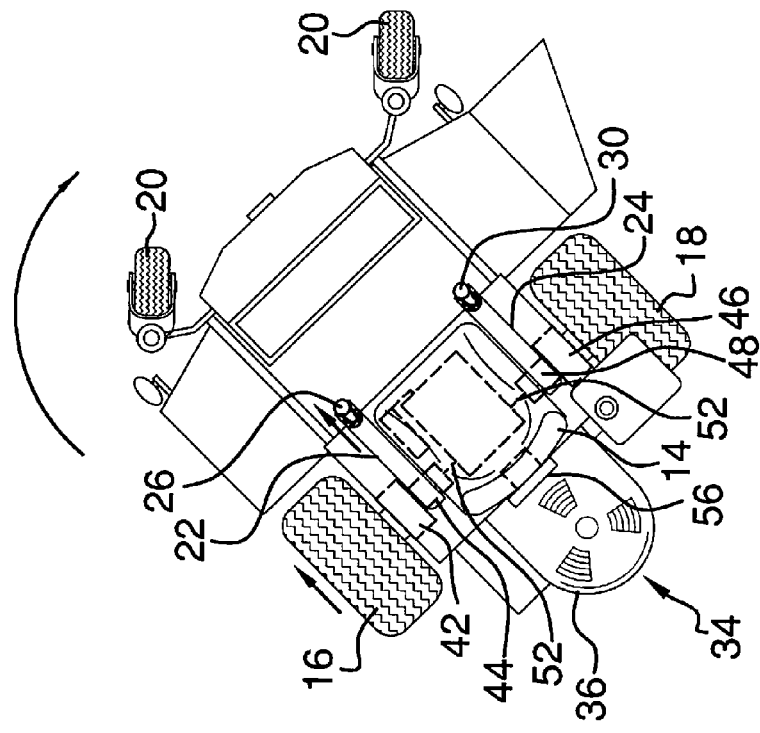
FIG. 4 is a top view of an embodiment of the disclosure.
Figure 3:
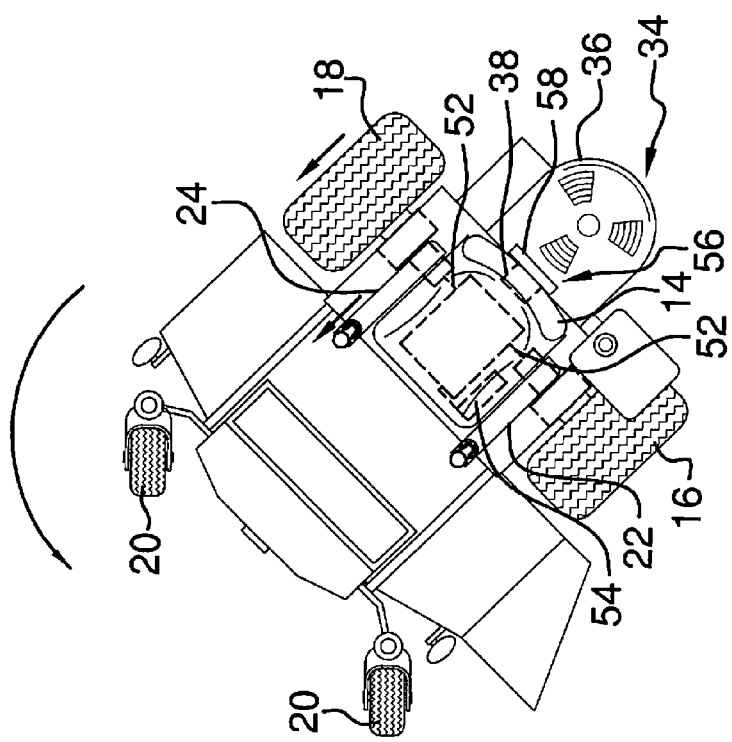
FIG. 3 is a top view of an embodiment of the disclosure.
Figure 5:
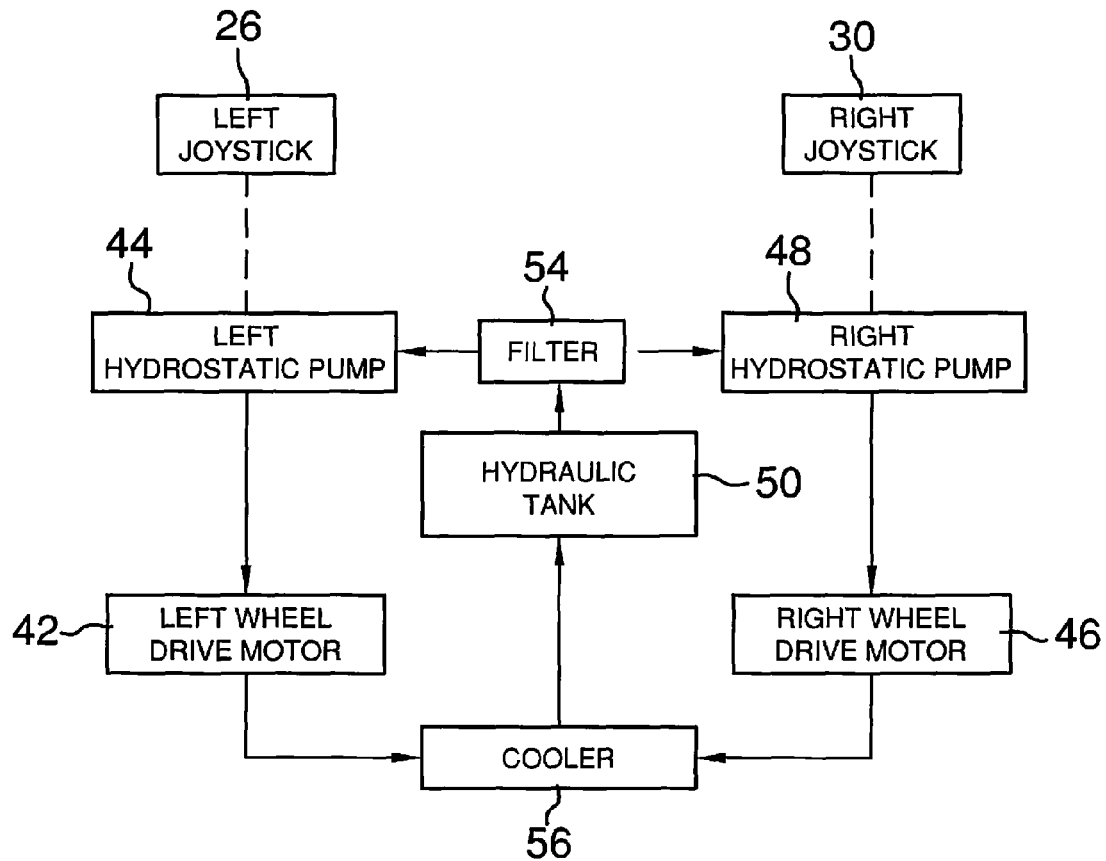
FIG. 5 is a schematic view of an embodiment of the disclosure.

With reference now to the drawings, and in particular to FIGS. 1 through 5 thereof, a new lawn mowing device embodying the principles and concepts of an embodiment of the disclosure and generally designated by the reference numeral 10 will be described.

As best illustrated in FIGS. 1 through 5, the lawnmower drive system 10 generally comprises a lawnmower 12 that has a seat 14 configured for supporting a person on the lawnmower 12. The lawnmower 12 has a left drive wheel 16 and a right drive wheel 18. The left 16 and right 18 drive wheels are aligned with the seat 14. The left 16 and right 18 drive wheels are operationally independent from each other. The lawnmower 12 has a pair of swiveled wheels 20 positioned in spaced relationship to the left drive wheel 16 and the right drive wheel 18 so the lawnmower 12 is supported in a level position on a support surface.

A left armrest 22 is coupled to the lawnmower 12. The left armrest 22 is positioned proximate the seat 14. A right armrest 24 is coupled to the lawnmower 12. The right armrest 24 is positioned proximate the seat 14. A left joystick 26 is coupled to the left armrest 22 at a left pivot point 28. The left joystick 26 may be selectively tilted forwardly and rearwardly about the left pivot point 28. The left joystick 26 is operationally coupled to the left drive wheel 16. A right joystick 30 is coupled to the right armrest 24 at a right pivot point 32. The right joystick 30 may be selectively tilted forwardly or rearwardly about the right pivot point 32. The right joystick 30 is operationally coupled to the right drive wheel 18.

A power source 34 is coupled to the lawnmower 12. The power source 34 may comprise an internal combustion engine 36. A power takeoff port 38 is coupled to the lawnmower 12. The power takeoff port 38 is mechanically coupled to the power source 34. A switch 40 is coupled to one of the left joystick 26 and the right joystick 30. The switch 40 is operationally coupled to the power takeoff port 38 so the power takeoff port 38 is selectively activated or deactivated by manipulation of the switch 40.

A left drive motor 42 is coupled to the lawnmower 12. The left drive motor 42 is operationally coupled to the left drive wheel 16. A left hydrostatic pump 44 is coupled to the lawnmower 12. The left hydrostatic pump 44 is operationally coupled to the left joystick 26 and the left drive motor 42. The left hydrostatic pump 44 may urge the left drive motor 42 to rotate the left drive wheel 16 in a forward direction when the left joystick 26 is tilted forwardly. The left hydrostatic pump 44 may urge the left drive motor 42 to rotate the left drive wheel 16 in a rearward direction when the left joystick 26 is tilted rearwardly.

A right drive motor 46 is coupled to the lawnmower 12. The right drive motor 46 is operationally coupled to the right drive wheel 18. A right hydrostatic pump 48 is coupled to the lawnmower 12. The right hydrostatic pump 48 is operationally coupled to the right joystick 30 and the right drive motor 46. The right hydrostatic pump 48 may urge the right drive motor 46 to rotate the right drive wheel 18 in a forward direction when the right joystick 30 is tilted forwardly. The right hydrostatic pump 48 may urge the right drive motor 46 to rotate the right drive wheel 18 in a rearward direction when the right joystick 30 is tilted rearwardly.

A hydraulic tank 50 is coupled to the lawnmower 12. The hydraulic tank 50 is operationally coupled to the left hydrostatic pump 44. The hydraulic tank 50 is operationally coupled to the right hydrostatic pump 50. A hydraulic line 52 is operationally coupled to the hydraulic tank 50, the left drive motor 42, the left hydrostatic pump 44, the right drive motor 46, and the right hydrostatic pump 48.

A hydraulic filter 54 is coupled to the hydraulic line 52 and extends between the hydraulic tank 50 and the left hydrostatic pump 44. The hydraulic filter 54 is coupled to the hydraulic line 52 between the hydraulic tank 50 and the right hydrostatic pump 48. The hydraulic filter 54 may of any conventional design. A hydraulic cooling unit 56 is coupled to a hydraulic line 52 between the hydraulic tank 50 and the left drive motor 42. The hydraulic cooling unit 56 is coupled to the hydraulic line 52 between the hydraulic tank 50 and the right drive motor 46. The hydraulic cooling unit 56 may comprise a heat exchanger 58.

In use, the left 26 and right 30 joysticks may each be tilted forwardly or rearwardly to control the motion of the lawnmower. The lawnmower 12 may turn left by tilting the right joystick 30 forwardly while leaving the left joystick 26 stationary. The lawnmower may turn right by tilting the left joystick 26 forwardly while leaving the right joystick 30 stationary. The lawnmower 12 may be driven forward in a straight line by simultaneously tilting both the left 26 and right 30 joysticks forwardly. The lawnmower may be driven rearward in a straight line by simultaneously tilting both the left 26 and right 30 joysticks rearwardly. The power takeoff port 38 may be activated or deactivated with the switch 40.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure.

I claim:

1. A lawnmower drive system comprising:
   a lawnmower having a seat configured for supporting a person on said lawnmower, said lawnmower having a left drive wheel and a right drive wheel;
   a left armrest coupled to said lawnmower, said left armrest being positioned proximate said seat;
   a right armrest coupled to said lawnmower, said right armrest being positioned proximate said seat;
   a left joystick coupled to said left armrest, said left joystick being operationally coupled to said left drive wheel;
   a right joystick coupled to said right armrest, said right joystick being operationally coupled to said right drive wheel;
   a power source coupled to said lawnmower;
   a power takeoff port coupled to said lawnmower, said power takeoff port being mechanically coupled to said power source; and
   a switch mounted directly on one of said left joystick and said right joystick, said switch being operationally coupled to said power takeoff port whereby said power takeoff port is selectively activated by manipulation of said switch.

2. The system of claim 1, further including said left drive wheel and said right drive wheel being operationally independent from each other.

3. The system of claim 2, further comprising:
   a left drive motor coupled to said lawnmower, said left drive motor being operationally coupled to said left drive wheel; and
   a left hydrostatic pump coupled to said lawnmower, said left hydrostatic pump being operationally coupled to said left joystick and said left drive motor.

4. The system of claim 3, further including a hydraulic tank coupled to said lawnmower, said hydraulic tank being operationally coupled to said left hydrostatic pump.

5. The system of claim 4, further including a hydraulic filter coupled to a hydraulic line extending between said hydraulic tank and said left hydrostatic pump.

6. The system of claim 4, further including a hydraulic cooling unit coupled to a hydraulic line extending between said hydraulic tank and said left drive motor.

7. The system of claim 2, further comprising:
   a right drive motor coupled to said lawnmower, said right drive motor being operationally coupled to said right drive wheel; and
   a right hydrostatic pump coupled to said lawnmower, said right hydrostatic pump being operationally coupled to said right joystick and said right drive motor.

8. The system of claim 7, further including a hydraulic tank operationally coupled to said right hydrostatic pump.

9. The system of claim 8, further including a hydraulic filter coupled to a hydraulic line extending between said hydraulic tank and said right hydrostatic pump.

10. The system of claim 8, further including a hydraulic cooling unit coupled to a hydraulic line extending between said hydraulic tank and said right drive motor.

11. The system of claim 1, further including said left drive wheel and said right drive wheel being aligned with said seat.

12. The system of claim 1, further including said lawnmower having a pair of swiveled wheels positioned in spaced relationship to said left drive wheel and said right drive wheel whereby said lawnmower is configured for being supported in a level position on a support surface.

13. A lawnmower drive system comprising:
   a lawnmower having a seat configured for supporting a person on said lawnmower, said lawnmower having a left drive wheel and a right drive wheel, said left drive wheel and said right drive wheel being aligned with said seat, said left drive wheel and said right drive wheel being operationally independent from each other, said lawnmower having a pair of swiveled wheels positioned in spaced relationship to said left drive wheel and said right drive wheel whereby said lawnmower is configured for being supported in a level position on a support surface;
   a left armrest coupled to said lawnmower, said left armrest being positioned proximate said seat;
   a right armrest coupled to said lawnmower, said right armrest being positioned proximate said seat;
   a left joystick coupled to said left armrest, said left joystick being operationally coupled to said left drive wheel;
   a right joystick coupled to said right armrest, said right joystick being operationally coupled to said right drive wheel;
   a power source coupled to said lawnmower;
   a power takeoff port coupled to said lawnmower, said power takeoff port being mechanically coupled to said power source;
   a switch directly mounted on one of said left joystick and said right joystick, said switch being operationally coupled to said power takeoff port whereby said power takeoff port is selectively activated by manipulation of said switch;
   a left drive motor coupled to said lawnmower, said left drive motor being operationally coupled to said left drive wheel;
   a left hydrostatic pump coupled to said lawnmower, said left hydrostatic pump being operationally coupled to said left joystick and said left drive motor;
   a right drive motor coupled to said lawnmower, said right drive motor being operationally coupled to said right drive wheel;
   a right hydrostatic pump coupled to said lawnmower, said right hydrostatic pump being operationally coupled to said right joystick and said right drive motor;
   a hydraulic tank coupled to said lawnmower, said hydraulic tank being operationally coupled to said left hydrostatic pump, said hydraulic tank being operationally coupled to said right hydrostatic pump;

a hydraulic line operationally coupled to said hydraulic tank, said left drive motor, said left hydrostatic pump, said right drive motor, and said right hydrostatic pump;

a hydraulic filter coupled to said hydraulic line extending between said hydraulic tank and said left hydrostatic pump, said hydraulic filter coupled to said hydraulic line between said hydraulic tank and said right hydrostatic pump; and a hydraulic cooling unit coupled to a hydraulic line between said hydraulic tank and said left drive motor, said hydraulic cooling unit being coupled to said hydraulic line between said hydraulic tank and said right drive motor.

* * * * *